(12) United States Patent
Shirai

(10) Patent No.: US 6,501,541 B2
(45) Date of Patent: Dec. 31, 2002

(54) ELECTRONIC DISTANCE METER

(75) Inventor: Masami Shirai, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/862,583

(22) Filed: May 23, 2001

(65) Prior Publication Data

US 2001/0048517 A1 Dec. 6, 2001

(30) Foreign Application Priority Data

May 25, 2000 (JP) .......................... 2000-154256

(51) Int. Cl.⁷ ................................................. G01C 3/08
(52) U.S. Cl. ......................................... 356/5.1; 356/4.01
(58) Field of Search ............................. 356/4.017, 5.15

(56) References Cited

U.S. PATENT DOCUMENTS

| | | | | |
|---|---|---|---|---|
| 4,916,324 A | * | 4/1990 | Meier | ........................ 250/561 |
| 5,760,905 A | | 6/1998 | Sasagawa | |
| 5,774,208 A | | 6/1998 | Abe | |
| 5,815,251 A | | 9/1998 | Ehbets et al. | |
| 5,886,340 A | | 3/1999 | Suzuki et al. | |
| 5,886,777 A | | 3/1999 | Hirunuma | |
| 5,923,468 A | | 7/1999 | Tsuda et al. | |
| 5,949,548 A | | 9/1999 | Shirai et al. | |
| 6,072,642 A | | 6/2000 | Shirai | |
| 6,194,694 B1 | | 2/2001 | Shirai | |
| 6,324,024 B1 | * | 11/2001 | Shirai et al. | ................. 359/884 |
| 6,333,783 B1 | * | 12/2001 | Ohishi | ....................... 356/4.01 |

* cited by examiner

*Primary Examiner*—Thomas H. Tarcza
*Assistant Examiner*—Brian Andrea
(74) *Attorney, Agent, or Firm*—Greenblum & Bernstein, P.L.C.

(57) ABSTRACT

An electronic distance meter includes a sighting telescope having an objective lens for sighting an object; a reflection member positioned behind the objective lens; an optical distance meter which includes a light-transmitting optical system for transmitting a measuring light via the reflection member and the objective lens, and a light-receiving optical system for receiving a portion of the measuring light which is reflected by the object, passed through the objective lens and not obstructed by the reflection member; a focus detecting device which detects a focus state from a correlation between a pair of images respectively formed by two light bundles which are respectively passed through two different pupil areas on the objective lens; and at least one optical element, positioned outside the two different pupil areas, to deflect the portion of the measuring light toward an optical axis of the light-receiving optical system.

21 Claims, 5 Drawing Sheets

ELECTRONIC DISTANCE METER

BACKGROUND OF THE INVENTION

1. Field of the Invention

The present invention relates to an electronic distance meter having a sighting telescope and a focus detection device for detecting a focus state of the sighting telescope.

2. Description of the Related Art

When a surveyor measures the distance between two points, an electronic distance meter (EDM) is generally used. An electronic distance meter calculates the distance via the phase difference between a projecting light and a reflected light and via the initial phase of an internal reference light, or via the time difference between the projecting light and the reflected light.

A typical electronic distance meter is provided, behind the objective lens of a sighting telescope thereof, with a light transmitting mirror positioned on the optical axis of the sighting telescope to project the measuring light toward a target through the center of the entrance pupil of the objective lens of the sighting telescope. The light which is reflected by the target to be passed through the objective lens of the sighting telescope passes the peripheral space of the light transmitting mirror to be captured via a wavelength selection filter and a light receiving mirror.

In such an electronic distance meter, the light which is reflected by the target and passed through the objective lens of the sighting telescope is interrupted by the aforementioned light transmitting mirror by a greater amount as the target is closer to the electronic distance meter. If the light which is reflected by the target and passed through the objective lens of the sighting telescope is interrupted by the light transmitting mirror by a great amount, the light amount of the incident light upon the aforementioned light receiving mirror decreases, which deteriorates the precision in measuring the object distance. If the target is very close to the electronic distance meter, the light which is reflected by the target and passed through the objective lens of the sighting telescope may not be incident on a light-receiving element (photo-receiver) at all, which makes it impossible to perform a distance measuring operation. To prevent these problems from occurring, various methods have been proposed.

Advancements have been made in the development of surveying instruments provided with a sighting telescope having an autofocus system, wherein phase-difference detection type autofocus system is widely used in the autofocus therefor. With this system, an in-focus state is detected based on the correlation between two images formed by two light bundles which are respectively passed through two different pupil areas upon passing through different portions of an objective lens of the sighting telescope to bring the sighting telescope into focus in accordance with the detected in-focus state.

However, in the case where a phase-difference detection type autofocus system is incorporated into an electronic distance meter, it is difficult to overcome the problem of a decrease in the amount of light incident upon the aforementioned light receiving element (photo-receiver) when the target is close to the electronic distance meter and also the problem of deterioration of the precision in measuring the object distance that is caused by a decrease in the amount of light incident upon the light receiving element.

SUMMARY OF THE INVENTION

The present invention has been devised in view of the problems noted above, and accordingly, an object of the present invention is to provide an electronic distance meter having a sighting telescope and a focus detection device for detecting a focus state of the sighting telescope, wherein the electronic distance meter is free from the problem of the amount of light incident upon a light-receiving element decreasing when the target is close to the electronic distance meter, and further free from deterioration of precision in measuring the object distance.

To achieve the objects mentioned above, according to an aspect of the present invention, an electronic distance meter is provided, including a sighting telescope having an objective lens for sighting an object; a reflection member positioned behind the objective lens on an optical axis of the objective lens; an optical distance meter which includes a light-transmitting optical system for transmitting a measuring light via the reflection member and the objective lens, and a light-receiving optical system for receiving a portion of the measuring light which is reflected by the object, subsequently passed through the objective lens and not obstructed by the reflection member; a phase-difference detection focus detecting device which detects a focus state from a correlation between a pair of images respectively formed by two light bundles which are respectively passed through two different pupil areas on the objective lens; and at least one optical element, positioned outside the two different pupil areas, to deflect the portion of the measuring light which is reflected by the object, subsequently passed through the objective lens and not obstructed by the reflection member, toward an optical axis of the light-receiving optical system.

Preferably, the at least one optical element has at least one function of reflecting, refracting, and diffracting light which is incident thereon.

Preferably, the at least one optical element is positioned between the two different pupil areas.

In an embodiment, the light-receiving optical system includes a wavelength selection mirror positioned behind the reflection member, the at least one optical element being positioned between two different pupil areas on the wavelength selection mirror.

In an embodiment, two of the optical elements are positioned on opposite sides of the optical axis of the light-receiving optical system.

In an embodiment, the light-receiving optical system includes a light-receiving element, the at least one optical element being designed so that a sufficient amount of the portion of measuring light which is reflected by the object is received by the light-receiving element when the object is positioned at a short distance.

In an embodiment, the at least one optical element is a Fresnel mirror which includes a series of mirror sections.

Preferably, the mirror sections of the Fresnel mirror function as either an inclined plane mirror or a concave mirror.

In an embodiment, the reflection member is made of a parallel-plate mirror having front and rear surfaces parallel to each other, the reflection member being inclined to the optical axis.

The present disclosure relates to subject matter contained in Japanese Patent Application No. 2000-154256 (filed on May 25, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
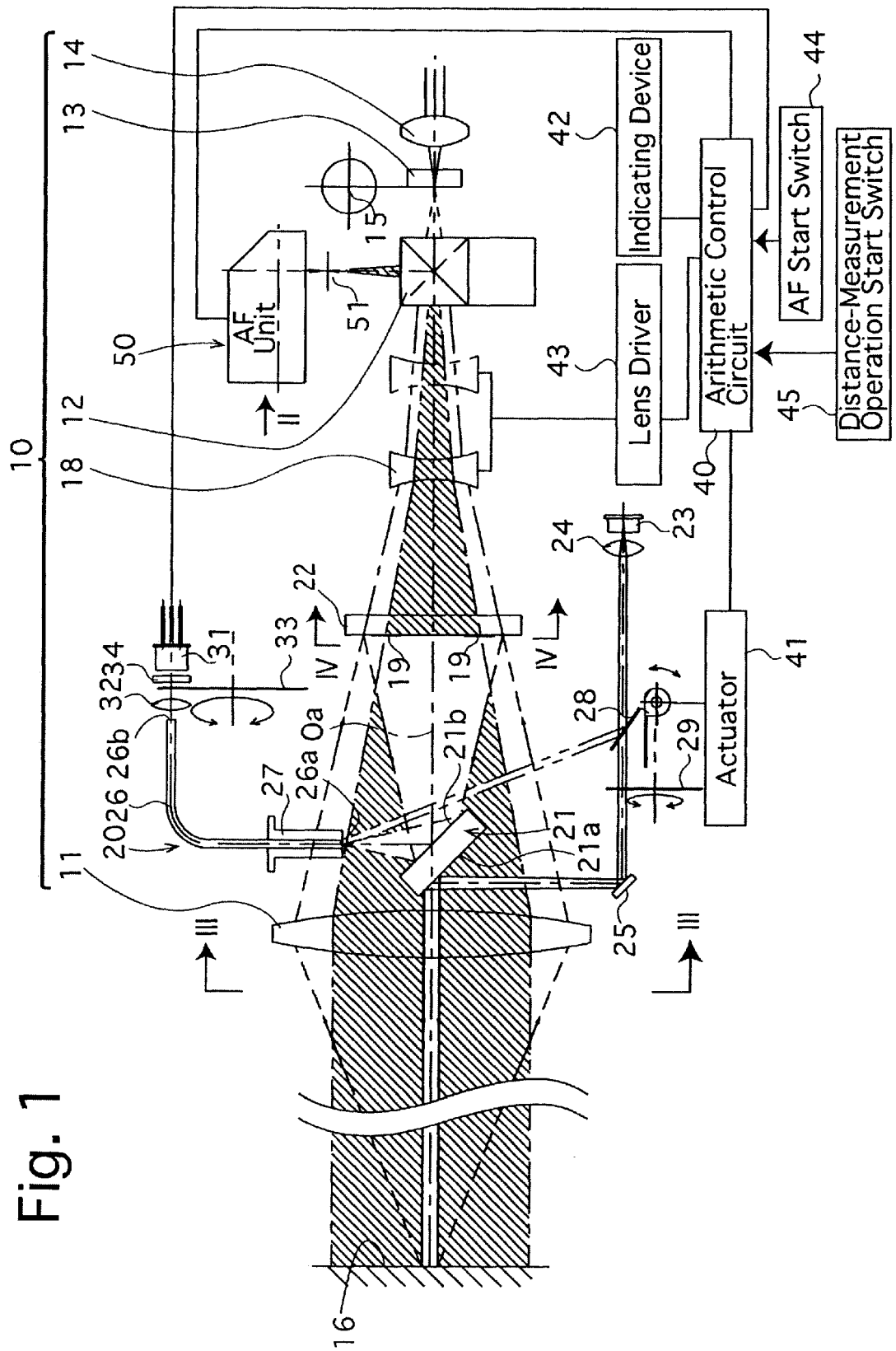
FIG. 1 is a schematic diagram of an embodiment of an electronic distance meter equipped with an autofocus system, according to the present invention.

FIG. 1 shows an embodiment of an electronic distance meter (EDM) equipped with an autofocus system, according to the present invention. The electronic distance meter is provided with a sighting telescope (sighting optical system) 10 and an optical distance meter 20. As shown in FIG. 1, the sighting telescope 10 is provided with an objective lens 11, a focusing lens (focus adjustment lens) 18, a Porro-prism erecting system 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The focusing lens 18 is guided in a direction of an optical axis of the sighting telescope 10. The image of a sighting object 16 that is formed through the objective lens 11 can be precisely focused on the front surface (the surface facing the objective lens 11) of the focal-plane plate 13 by adjusting the axial position of the focusing lens 18 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The electronic distance meter is provided, behind the objective lens 11 of the sighting telescope 10, with a light transmitting/receiving mirror (reflection member) 21 and a wavelength selection mirror (wavelength selection filter) 22, which are arranged in that order from the object side. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection mirror 22 is formed as a light receiving mirror 21b. The light receiving mirror 21b and the wavelength selection mirror 22 are fundamental optical elements of a light-receiving optical system of the optical distance meter 20.

The optical distance meter 20 is provided with a light-emitting element (laser diode) 23 which emits light (measuring light) having a specific wavelength. The measuring light emitted from the light-emitting element 23 is incident on the light transmitting mirror 21a via a collimating lens 24 and a fixed mirror 25. The measuring light, emitted from the light-emitting element 23 to be incident on the light transmitting mirror 21a, is reflected hereby to proceed toward the sighting object 16 along the optical axis of the objective lens 11. The collimating lens 24, the fixed mirror 25 and the light transmitting mirror 21a (light transmitting/receiving mirror 21) are fundamental optical elements of a light-transmitting optical system of the optical distance meter 20.

The portion of the measuring light which is reflected by the sighting object 16, subsequently passed through the objective lens 11 which is not interrupted by the light transmitting/receiving mirror 21 is eventually reflected back to the light receiving mirror 21b by the wavelength selection mirror 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11.

The electronic distance meter is provided between the light-emitting element 23 and the fixed mirror 25, on a distance-measuring optical path, with a switching mirror 28 and an ND filter 29. The light (measuring light) emitted by the light-emitting element 23 is incident on the fixed mirror 25 when the; switching mirror 28 is retracted from the distance-measuring optical path between the collimating lens 24 and the fixed mirror 25, and the light (internal reference light) emitted by the light-emitting element 23 is reflected by the switching mirror 28 to be incident directly on the incident end surface 26a of the light receiving optical fiber 26 when the switching mirror 28 is positioned in the distance-measuring optical path between the collimating lens 24 and the fixed mirror 25. The ND filter 29 is used to adjust the amount of light of the measuring light incident on the sighting object 16.

The electronic distance meter is provided between an exit end surface 26b of the light receiving optical fiber 26 and a light-receiving element 31 with a condenser lens 32, an ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

As is known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the sighting object 16 via the light-transmitting mirror 21a and the objective lens 11, and the measuring light reflected by the sighting object 16 is incident on the incident end surface 26a via the objective lens 11, the wavelength selection mirror 22, and the light receiving mirror 21b. Thereafter, both the measuring light reflected by the sighting object 16 to be eventually incident on the incident end surface 26a, and the internal reference light directly supplied to the incident end surface 26a via the switching mirror 28 are received by the light-receiving element 31. The arithmetic control circuit 40 detects the phase difference between the projecting light and the reflected light and the initial phase of the internal reference light, or the time difference between the projecting light and the reflected light, to calculate the distance from the electronic distance meter to the sighting object 16. The calculated distance is indicated by the indicating device 42. Such an operation of calculating the distance from the phase difference between the projecting light and the reflected light and from the initial phase of the internal reference light, or from the time difference between the projecting light and the reflected light is well known in the art.

Figure 2:
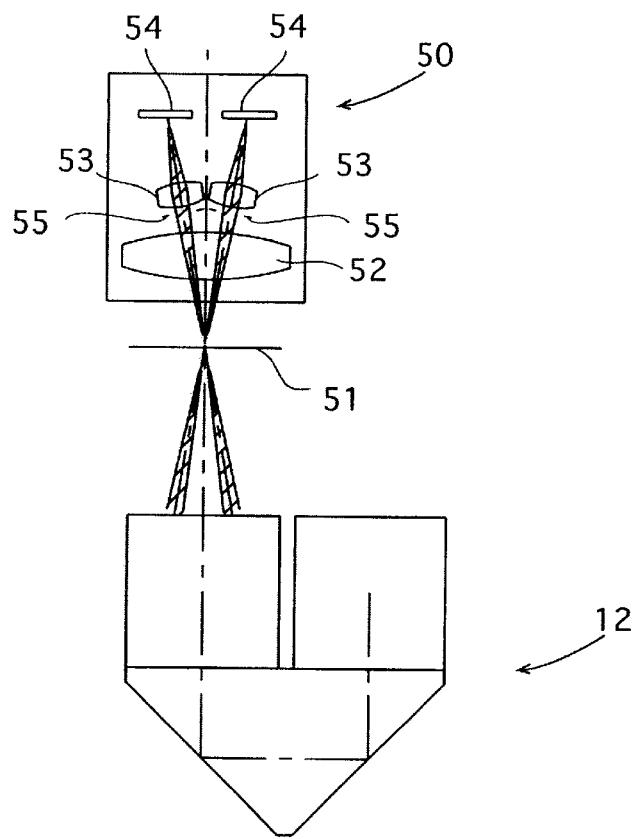
FIG. 2 is a conceptual diagram of a focus detecting device and a Porro-prism erecting system, as viewed in the direction of an arrow II shown in FIG. 1.

The Porro-prism erecting system 12 is provided with a beam splitting surface which splits the incident light bundle into two light bundles, so that one of the two light bundles proceeds toward a phase-difference detection type AF sensor unit (phase-difference detection focus detecting device) 50 while the other light bundle proceeds toward the eyepiece 14. Between the Porro-prism erecting system 12 and the AF sensor unit 50 is formed a reference focal plane 51 which is located at a position optically equivalent to the position at which the reticle 15 of the focal-plane plate 13 is placed. The AF sensor unit 50 detects the focus state (i.e., the amount of defocus and direction of focal shift) on the reference focal plane 51. FIG. 2 shows a conceptual diagram of the AF sensor unit 50 and the Porro-,prism erecting system 12. The AF sensor unit 50 includes a condenser lens 52, a pair of separator lenses 53, a pair of separator masks 55 located in the close vicinity of the pair of separator lenses 53, and a pair of line sensors (,e.g., multi segment CCD sensors) 54 located behind the respective separator lenses 53. The pair of separator lenses 53 are arranged apart from each other by the base length. The image of the sighting object 11 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the focusing lens 18 to bring the sighting object into focus via a lens driver (see FIG. 1) 43 in accordance with the calculated amount of defocus. The defocus operation is well-known in the art. An AF start switch 44 and a distance-measurement operation start switch 45 are connected to the arithmetic control circuit 40.

The phase-difference detection AF sensor unit 50 detects an in-focus state from the pair of images respectively formed on the pair of line sensors 54 by two light bundles which are respectively passed through two different pupil areas 11A and 11B on the objective lens 11. The shape of each of the two pupil areas 11A and 11B are determined by the shape of the aperture formed on a corresponding one of a pair of separator masks 55 which are respectively positioned in the vicinity of the pair of separator lenses 53 between the condenser lens 52 and the pair of separator lenses 53. It should be noted that the hatched areas seen in FIGS. 2 and 3 conceptually indicate areas which correspond to the pupil areas determined by the apertures of the pair of separator masks 55.

Figure 3:
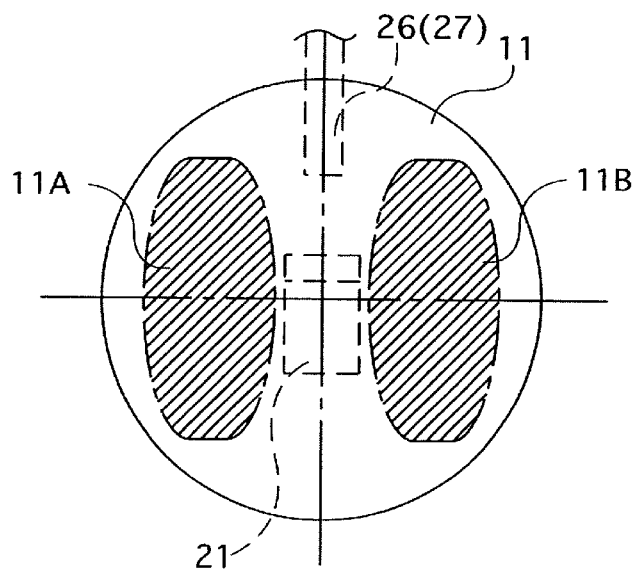
FIG. 3 is, an explanatory view of an objective lens of a sighting telescope, as viewed in the direction of arrows III shown in FIG. 1, showing the positional relationship among two pupil areas defined on the objective lens, a light transmitting/receiving mirror, and a light receiving fiber.

FIG. 3 shows the positional relationship between the two pupil areas 11A and 11B and the positional relationship between the light transmitting/receiving mirror 21 and the light receiving optical fiber 26 (the fiber holder 27) of the optical distance meter 20. Although the positions, shapes and directions of the two pupil areas 11A and 11B are determined by the condenser lens 52, the pair of separator lenses 53, the pair of separator masks 55, and the array of photoelectric converting elements of each line sensor 54 so as to satisfy the performance of autofocus, the position of the two pupil areas 11A and 11B with respect to the center of the objective lens 11 can be determined relatively freely. In addition, the positions of the two pupil areas 11A and 11B are determined so as not to interfere with the optical path of the measuring light reflected by the light transmitting mirror 21a. In other words, the light transmitting/receiving mirror 21 is positioned so as not to interfere with the two pupil areas 11A and 11B.

Figure 4:
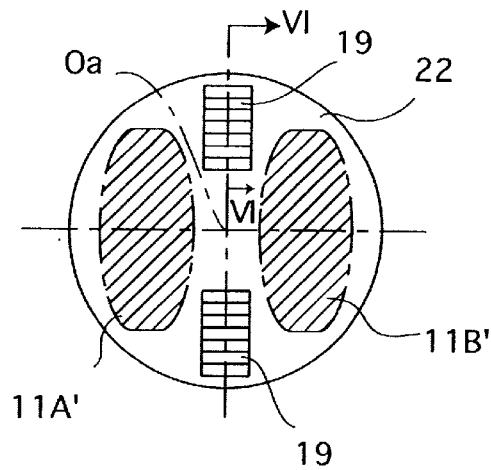
FIG. 4 is an explanatory view of a wavelength selection filter, as viewed in the direction of arrows IV shown in FIG. 1, showing the positional relationship among the two pupil areas defined on the objective lens and two Fresnel mirrors formed on the objective lens.
Figure 9:
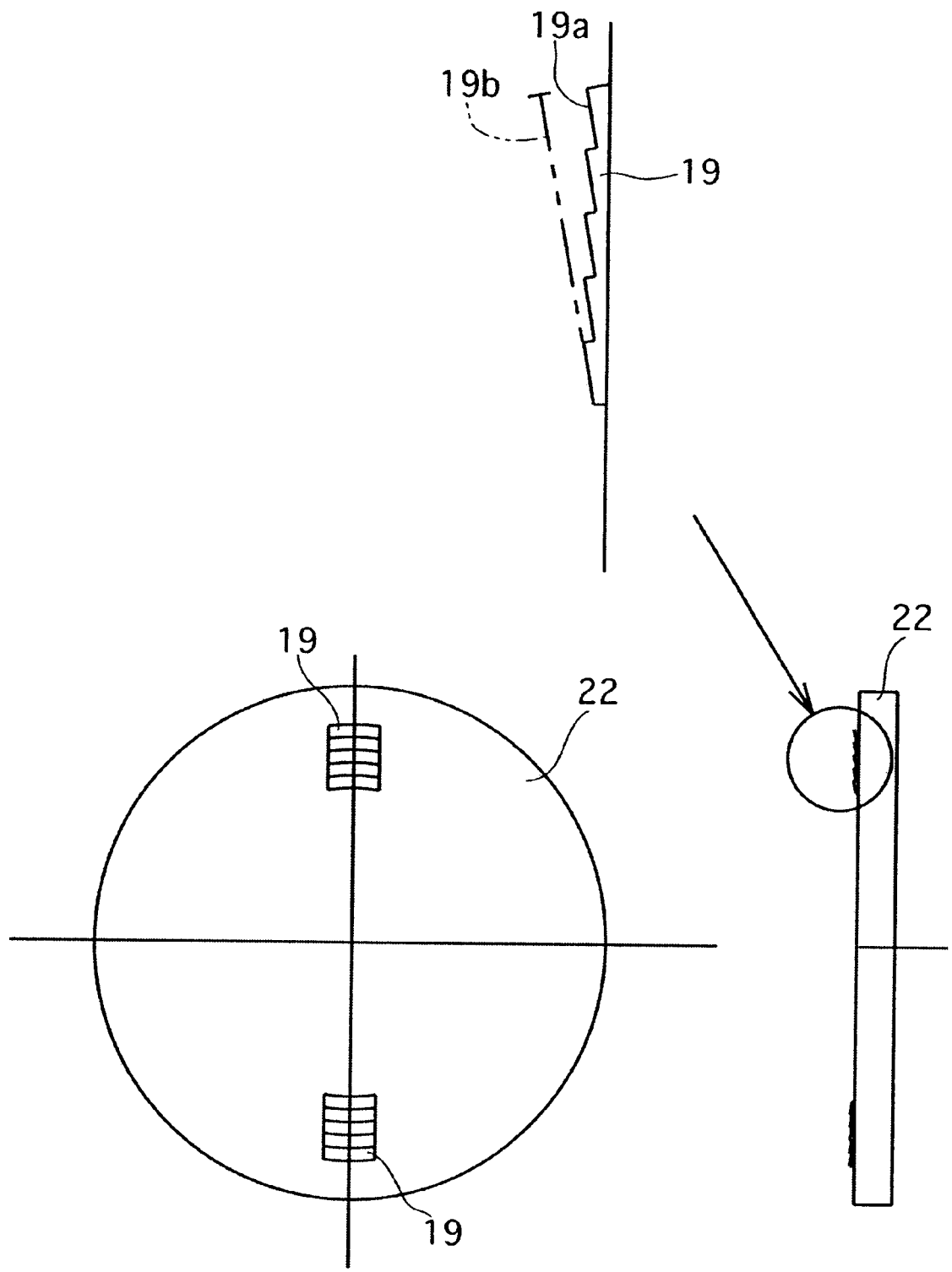
FIG. 9 is an sectional view of a Fresnel mirror which is utilized in the present invention, as viewed in the direction of the arrows VI shown in FIG. 4.

In the present embodiment of the electronic distance meter having the above described structures, the wavelength selection mirror 22 is provided with two Fresnel mirrors (optical elements) 19 formed on the front surface thereof, which faces the light transmitting/receiving mirror 21 so that a sufficient light amount of the measuring light which is reflected by the sighting object, passed through the objective lens 11 and reflected by the wavelength selection mirror 22 is incident on the incident end surface 26a of the light receiving optical fiber 26, especially when the sighting object 16 is positioned at a short distance. As shown in FIG. 9, each of the two Fresnel mirrors (mirrors of Fresnel type) 19 functions as an inclined plane mirror 19b shown by a two-dotted chain line, which is not normal to and inclined with respect to an optical axis Oa of the light-receiving optical system, and includes a series of mirror sections (similar to a surface of a Fresnel lens which has a series of simple lens sections) 19a, so that the incident light upon each Fresnel mirror 19 is reflected and deflected thereby toward the optical axis Oa of the light-receiving optical system of the optical distance meter 20. The term Fresnel mirror, or mirror of Fresnel type, in this specification is defined as a mirror having a series of mirror sections 19a which function as a single mirror so that the total thickness in the optical axis direction Oa thereof is reduced with respect to the equivalent single mirror. Note that it is possible to alternatively provide the Fresnel mirror 19 as a Fresnel concave mirror which functions as a concave mirror having a positive power. As shown in FIG. 4, the two Fresnel mirrors 19 are positioned between two pupil areas 11A' and 11B' on the wavelength selection mirror 22 on opposite sides of the optical axis Oa (on the upper and lower sides of the optical axis Oa as viewed in FIG. 4) so as not to interfere with the two pupil areas 11A' and 11B', namely, so as not to have any adverse effect on the precision of the AF sensor unit 50 in measuring the object distance.

Figure 5:
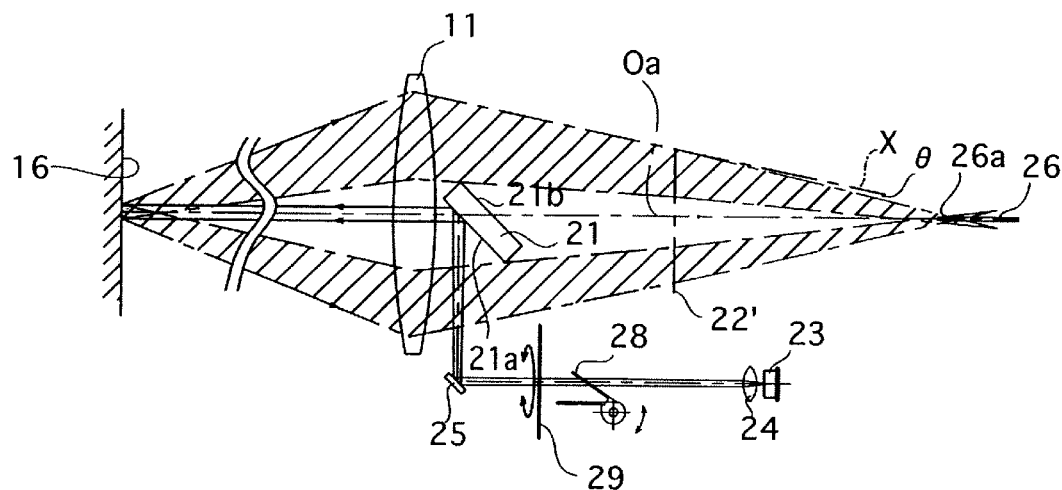
FIG. 5 is a developed view of an optical system of an optical distance meter of the electronic distance meter shown in FIG. 1.
Figure 6:
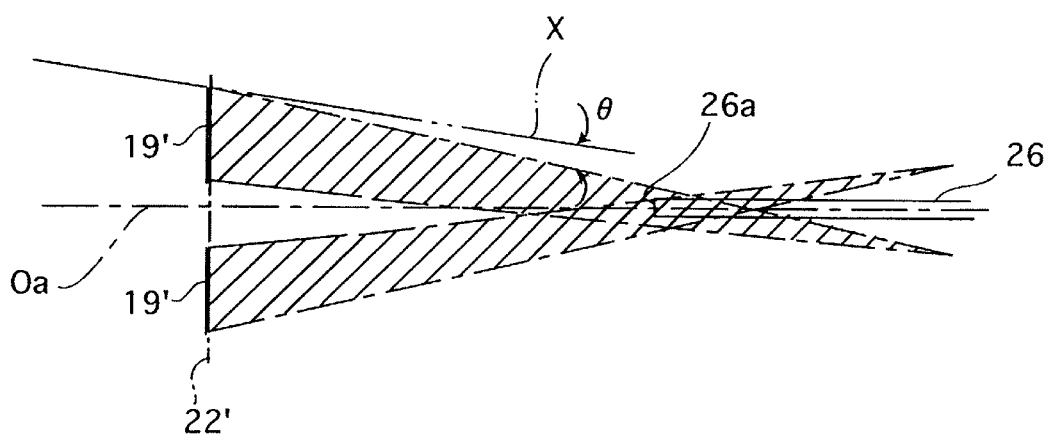
FIG. 6 is an enlarged view of a fundamental portion of the optical system of the optical distance meter shown in FIG. 5, showing the incident end surface of a light receiving optical fiber and the periphery thereof.

FIGS. 5 and 6 show the optical paths of the two light bundles of the measuring light which are reflected and deflected by the two Fresnel mirrors 19, respectively. In each of FIGS. 5 and 6, the optical path between the wavelength selection mirror 22 and the incident end surface 26a of the light receiving optical fiber 26 via the light receiving mirror 21b is shown as a straight optical path for the purpose of illustration. In each of FIGS. 5 and 6, the wavelength selection mirror 22, which has the two Fresnel mirrors 19, is not shown for the purpose of illustration, but the position of the wavelength selection mirror 22 is indicated by a chain line designated by a reference numeral 22'. In FIG. 6, the position of each Fresnel mirror 19 is indicated by a solid line designated by a reference numeral 19'. The upper and lower hatched areas shown in FIGS. 5 and 6 represent the upper and lower optical paths of the two light bundles of the measuring light which are reflected by the sighting object 16, passed through the objective lens 11 and subsequently reflected and deflected by the upper and lower Fresnel mirrors 19, respectively. In each of FIGS. 5 and 6, a two-dot chain line X represents the uppermost light ray of the measuring light reflected by the wavelength selection mirror 22 in the case where no Fresnel mirror corresponding to each Fresnel mirror 19 is formed on the wavelength selection mirror 22. As can be clearly understood from FIGS. 5 and 6, each of the two light bundles of the measuring light which are incident on the upper and lower Fresnel mirrors 19, respectively., is deflected thereby toward the optical axis Oa by an angle of deviation θ (see FIG. 6) to be correctly incident on the incident end surface 26a of the light receiving optical fiber 26.

The size and the inclination angle (or power in the case of a Fresnel concave mirror) of each Fresnel mirror 19 is preferably determined so that a sufficient amount of the measuring light reflected by the sighting object 16 is incident on the incident end surface 26a of the light receiving optical fiber 26 without interfering with the two pupil areas 11A' and 11B' on the wavelength selection mirror 22.

The electronic distance meter equipped with an autofocus system which has the above described structure performs a distance measuring operation in a manner such as described in the following description.

In the first step, a surveyor (user) aims the sighting telescope 10 at the sighting object 16 so that the optical axis of the sighting telescope 10 is generally in line with the sighting object 16, while viewing the sighting object 16 through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the sighting object 16. In the third step, in a state where the sighting telescope 10 is in focus relative to the sighting object 16, the surveyor adjusts the direction of the sighting telescope 10 so that the reticle (cross hair) 15 viewed through the eyepiece 14 is precisely centered on the sighting object 16 while looking into the eyepiece 14. In the fourth step, the surveyor depresses the distance-measurement operation start switch 45 to perform the aforementioned distance-calculating operation, wherein the calculated distance is indicated on the indicating device 42.

In the above described distance measuring operation, when the measuring light emitted from the light-emitting element 23, reflected by the sighting object 16 and passed through the objective lens 11 is reflected by the wavelength selection filter 22, the measuring light is incident on the incident end surface 26a of the light receiving optical fiber 26 via the Fresnel mirrors 19 with a sufficient amount of light even if the sighting object 16 is positioned at a short distance since each of the two light bundles of the measuring light which are incident on the upper and lower Fresnel mirrors 19, respectively, is deflected thereby toward the optical axis Oa by an angle of deviation θ to be securely incident on the incident end surface 26a of the light receiving optical fiber 26. Therefore, the distance measuring operation can be performed with no deterioration in precision. The further the sighting object 16 is from the electronic distance meter, the measuring light reflected by the sighting object 16 is incident on the objective lens 11 with a smaller angle of incidence, so that a sufficient light amount of the measuring light is incident on the incident end surface 26a of the light receiving optical fiber 26 regardless of whether the Fresnel mirrors 19 is provided or not. Hence, the distance measuring operation can be performed with no deterioration in precision when the sighting object 16 is positioned at a long distance. Moreover, since the two Fresnel mirrors 19 are positioned between two pupil areas 11A' and 11B', the two Fresnel mirrors 19 do not have any adverse effect on the AF sensor unit 50 which uses the light bundles which are passed through the corresponding two pupil areas 11A and 11B to thereby ensure the autofocus operation. Furthermore, since the light transmitting/receiving mirror 21 is positioned so as not to interfere with the two pupil areas 11A and 11B as discussed above, the light transmitting/receiving mirror 21 does not have any adverse effect on the AF sensor unit 50 either.

Figure 7:
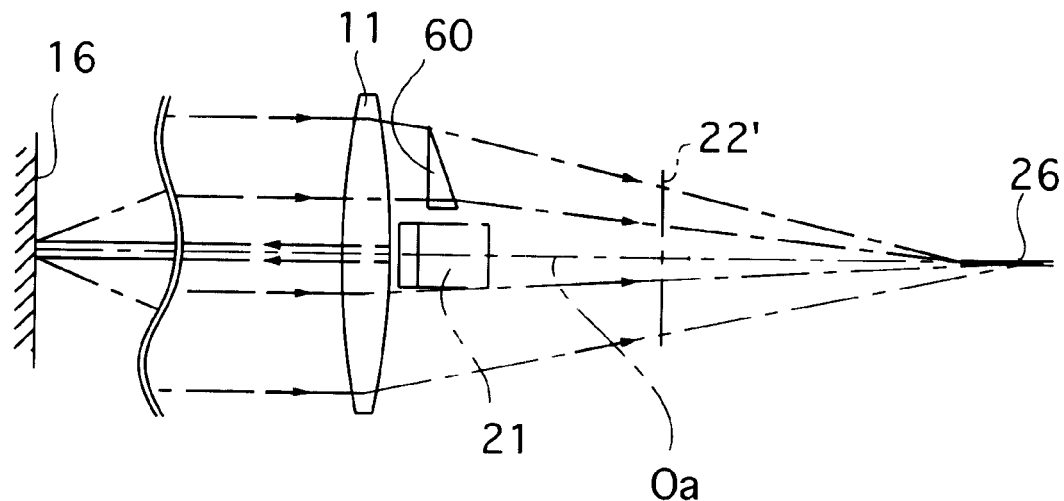
FIG. 7 is a view similar to that of FIG. 5 and illustrates an undesirable example of a fundamental portion of an optical system of the optical distance meter of the electronic distance meter.
Figure 8:
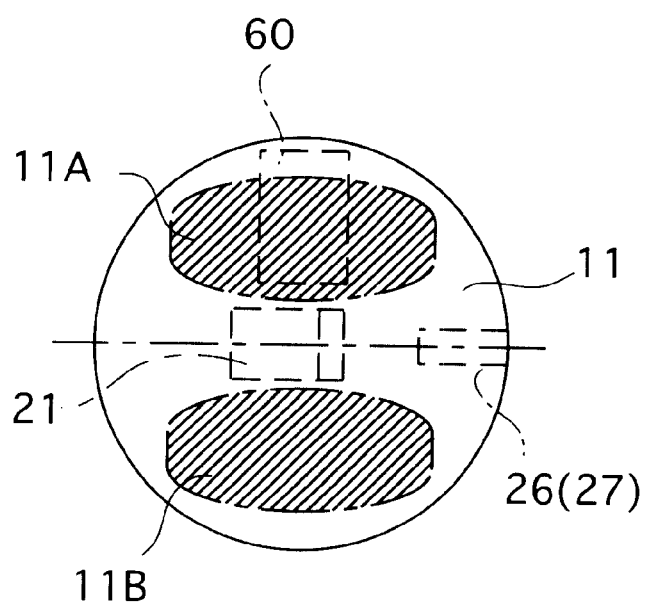
FIG. 8 is a view similar to that of FIG. 3 and illustrates the positional relationship among two pupil areas defined on the objective lens, a light transmitting/receiving mirror, and a light receiving fiber in the optical distance meter shown in FIG. 7.

FIGS. 7 and 8 show a comparative example of a fundamental portion of an optical system of the optical distance meter which is to be compared with that of the optical distance meter 20 of the above illustrated embodiment of the electronic distance meter. Similar to each of FIGS. 5 and 6, in FIG. 7 the wavelength selection mirror 22 is not shown for the purpose of illustration, but the position of the wavelength selection mirror 22 is indicated by a chain line designated by a reference numeral 22'. In the example shown in FIG. 7, an adjusting prism 60 is disposed between the objective lens 11 and the wavelength selection mirror 22 so that part of the measuring light reflected by the sighting object 16 positioned at a short distance is deflected toward the optical axis Oa of the light-receiving optical system of the optical distance meter 20. In this example, although a sufficient light amount of the measuring light is securely incident on the incident end surface 26a of the light receiving optical fiber 26, the adjusting prism 60 interferes with the two pupil areas 11A and 11B on the objective lens 11 as shown in FIG. 8 in the case where a phase-difference detection type autofocus system is incorporated into the electronic distance meter, which clearly has an adverse effect on the autofocus operation. Due to this reason, it is difficult to incorporate an autofocus system into the electronic distance meter using the adjusting prism 60.

In the above illustrated embodiment, although the Fresnel mirrors 19 are used as reflecting optical elements provided on the wavelength selection mirror 22, any other optical elements can be used as the reflecting optical elements. Moreover, not only reflecting optical elements such as Fresnel mirrors but also refracting optical elements (e.g., refracting prisms) or diffracting optical elements (e.g., a diffraction grating) can be used as long as each of such optical elements has the function of deflecting the incident light toward the optical axis of the light-receiving optical system of the optical distance meter.

It should be noted that the Porro-prism erecting system 12, which serves as an erecting optical system, and the beam splitting optical system (the aforementioned beam splitting surface formed on the Porro-prism erecting system 12) for the AF sensor unit 50 can be replaced by similar optical members, since various optical members which function in the same manner are known in the art.

As can be understood from the foregoing, according to an electronic distance meter having a sighting telescope and a focus detection device for detecting a focus state of the sighting telescope, to which the present invention is applied, the electronic distance meter is free from the problem of the amount of light incident upon the light-receiving element decreasing when the target is close to the electronic distance meter, and free from deterioration of precision in measuring the object distance.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An electronic distance meter comprising:
   a sighting telescope having an objective lens that sights an object;
   a reflection member positioned behind said objective lens on an optical axis of said objective lens;
   an optical distance meter which includes a light-transmitting optical system that transmits a measuring light via said reflection member and said objective lens, and a light-receiving optical system that receives a portion of said measuring light which is reflected by said object, subsequently passing through said objective lens and passing around said reflection member;
   a phase-difference detection focus detecting device which detects a focus state from a correlation between a pair of images respectively formed by two light bundles which are respectively passed through two different pupil areas on said objective lens; and
   at least one optical element, positioned outside said two different pupil areas, that deflects said portion of said measuring light which is reflected by said object, toward an optical axis of said light-receiving optical system.

2. The electronic distance meter according to claim 1, wherein said at least one optical element has at least one function of reflecting, refracting, and diffracting light which is incident thereon.

3. The electronic distance meter according to claim 1, wherein said at least one optical element is positioned between said two different pupil areas.

4. The electronic distance meter according to claim 1, wherein said light-receiving optical system comprises a wavelength selection mirror positioned behind said reflection member, said at least one optical element being positioned between two different pupil areas on said wavelength selection mirror.

5. The electronic distance meter according to claim 4, wherein said at least one optical element comprises two optical elements which are positioned on opposite sides of said optical axis of said light-receiving optical system.

6. The electronic distance meter according to claim 1, wherein said light-receiving optical system comprises a light-receiving element, said at least one optical element being designed so that a sufficient amount of said portion of measuring light which is reflected by said object is received by said light-receiving element when said object is positioned at a short distance.

7. The electronic distance meter according to claim 1, wherein said at least one optical element comprises a Fresnel mirror which includes a series of mirror sections.

8. The electronic distance meter according to claim 7, wherein said mirror sections of said Fresnel mirror function as one of an inclined plane mirror and a concave mirror.

9. The electronic distance meter according to claim 1, wherein said reflection member is made of a parallel-plate mirror having front and rear surfaces parallel to each other, said reflection member being inclined to said optical axis.

10. The electronic distance meter according to claim 1, further comprising a wavelength selection mirror, a light bundle transmitted to the phase-difference detection focus detecting device and a light bundle transmitted to the light receiving optical system being determined by said wavelength selection mirror.

11. An electronic distance meter comprising:
    a sighting telescope having an objective lens that sights an object;
    a reflection member positioned behind said objective lens on an optical axis of said objective lens;
    an optical distance meter which includes a light-transmitting optical system that transmits a measuring light via said reflection member and said objective lens, and a light-receiving optical system that receives a portion of said measuring light which is reflected by the object, subsequently passed through said objective lens and not obstructed by said reflection member;
    a phase-difference detection focus detecting device which detects a focus state from a correlation between a pair of images respectively formed by two light bundles which are respectively passed through two different pupil areas on said objective lens; and
    at least one optical element, positioned outside said two different pupil areas, that deflects said portion of said measuring light which is reflected by said object, subsequently passed through said objective lens and not obstructed by said reflection member, toward an optical axis of said light-receiving optical system, said at least one optical element comprising two optical elements which are positioned on opposite sides of said optical axis of said light-receiving optical system.

12. The electronic distance meter according to claim 11, said light-receiving optical system comprising a wavelength selection mirror positioned behind said reflection member, said at least one optical element being positioned between two different pupil areas on said wavelength selection mirror.

13. The electronic distance meter according to claim 11, said at least one optical element has at least one reflecting, refracting, and diffracting light incident thereon.

14. The electronic distance meter according to claim 11, said reflection member comprising a parallel-plate mirror having front and rear surfaces parallel to each other, said reflection member being inclined to said optical axis.

15. The electronic distance meter according to claim 11, said light-receiving optical system comprising a wavelength selection mirror positioned behind said reflection member, said at least one optical element being positioned between two different pupil areas on said wavelength selection mirror.

16. An electronic distance meter comprising:

a sighting telescope having an objective lens that sights an object;

a reflection member positioned behind said objective lens on an optical axis of said objective lens;

an optical distance meter which includes a light-transmitting optical system that transmits a measuring light via said reflection member and said objective lens, and a light-receiving optical system that receives a portion of said measuring light which is reflected by the object, subsequently passed through said objective lens and not obstructed by said reflection member;

a phase-difference detection focus detecting device which detects a focus state from a correlation between a pair of images respectively formed by two light bundles which are respectively passed through two different pupil areas on said objective lens; and at least one optical element, positioned outside said two different pupil areas, that deflects said portion of said measuring light which is reflected by said object, subsequently passed through said objective lens and not obstructed by said reflection member, toward an optical axis of said light-receiving optical system, said at least one optical element comprising a Fresnel mirror which includes a series of mirror sections.

17. The electronic distance meter according to claim 16, said mirror sections of said Fresnel mirror comprising one of an inclined plane mirror and a concave mirror.

18. The electronic distance meter according to claim 16, said reflection member comprising a parallel-plate mirror having front and rear surfaces parallel to each other, said reflection member being inclined to said optical axis.

19. The electronic distance meter according to claim 16, said light-receiving optical system comprising a wavelength selection mirror positioned behind said reflection member, said at least one optical element being positioned between two different pupil areas on said wavelength selection mirror.

20. The electronic distance meter according to claim 16, said at least one optical element comprising two optical elements which are positioned on opposite sides of said optical axis of said light-receiving optical system.

21. The electronic distance meter according to claim 1, said at least one optical element configured to deflect said portion of said measuring light which is reflected by said object towards an optical axis of said sighting telescope.

* * * * *